(12) United States Patent
Okada et al.

(10) Patent No.: US 10,011,026 B2
(45) Date of Patent: Jul. 3, 2018

(54) ROBOT

(71) Applicant: Kabushiki Kaisha Yaskawa Denki, Kitakyushu-shi (JP)

(72) Inventors: Takuya Okada, Kitakyushu (JP); Yasuyuki Ishibe, Kitakyushu (JP); Takeyuki Ninomiya, Kitakyushu (JP); Yoshitaka Fukudome, Kitakyushu (JP); Kyoko Sotobayashi, Kitakyushu (JP)

(73) Assignee: KABUSHIKI KAISHA YASKAWA DENKI, Kitakyushu-shi (JP)

( * ) Notice: Subject to any disclaimer, the term of this patent is extended or adjusted under 35 U.S.C. 154(b) by 0 days.

(21) Appl. No.: 15/414,672

(22) Filed: Jan. 25, 2017

(65) Prior Publication Data

US 2017/0217025 A1    Aug. 3, 2017

(30) Foreign Application Priority Data

Jan. 29, 2016    (JP) ................................. 2016-015763

(51) Int. Cl.
*B25J 19/00* (2006.01)
*B25J 17/00* (2006.01)

(52) U.S. Cl.
CPC ........... *B25J 17/00* (2013.01); *B25J 19/0075* (2013.01); *Y10S 901/28* (2013.01)

(58) Field of Classification Search
CPC .... B25J 17/00; B25J 17/0225; B25J 17/0233; B25J 17/0241

USPC ............................ 74/490.01, 490.05; 901/28
See application file for complete search history.

(56) References Cited

U.S. PATENT DOCUMENTS

| 4,678,952 A * | 7/1987 | Peterson ................. B25J 9/1025 310/83 |
| 2008/0258402 A1 | 10/2008 | Tamura et al. |

FOREIGN PATENT DOCUMENTS

JP    2008-55560 A    3/2008

* cited by examiner

*Primary Examiner* — Anna M Momper
*Assistant Examiner* — Ronald P Jarret
(74) *Attorney, Agent, or Firm* — Oblon, McClelland, Maier & Neustadt, L.L.P.

(57) ABSTRACT

A robot includes a joint and a drive mechanism disposed in the joint. A reducer includes an output shaft and a fixed portion. A first seal seals a gap between the output shaft and the fixed portion. A first cover is fixed to the fixed portion and covers an outer surface of the fixed portion. An intermediate portion is fixed to an output-side portion of the output shaft. A second cover is fixed to an output-side portion of the intermediate portion and covers an outer surface and an output-side edge of the first cover. A second seal seals a gap between the first cover and the intermediate portion. A groove extends approximately over a circumference of the outer surface of the first cover.

20 Claims, 3 Drawing Sheets

ROBOT

CROSS-REFERENCE TO RELATED APPLICATIONS

The present application claims priority under 35 U.S.C. § 119 to Japanese Patent Application No. 2016-015763, filed Jan. 29, 2016. The contents of this application are incorporated herein by reference in their entirety.

BACKGROUND

Field of the Invention

The embodiments disclosed herein relate to a robot.

Discussion of the Background

Japanese Unexamined Patent Application Publication No. 2008-55560 discloses a robot that has a double contact-seal structure to prevent foreign matter (such as water and dust) in the environment from entering the joints of the robot.

SUMMARY

According to one aspect of the present disclosure, a robot includes a joint and a drive mechanism. The drive mechanism is disposed in the joint. The drive mechanism includes a reducer, a first seal, a first cover, an intermediate portion, a second cover, a second seal, and a groove. The reducer includes an output shaft and a fixed portion. The first seal is disposed in a first gap between the output shaft and the fixed portion to seal the first gap. The first cover is fixed to the fixed portion and extends beyond the fixed portion toward the output side to cover an outer surface of the fixed portion. The intermediate portion is fixed to an output-side portion of the output shaft. The second cover is fixed to an output-side portion of the intermediate portion and covers an outer surface of the first cover and an output-side edge of the first cover. The second seal is disposed in a second gap between the first cover and the intermediate portion to seal the second gap. The groove extends approximately over a circumference of the outer surface of the first cover.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
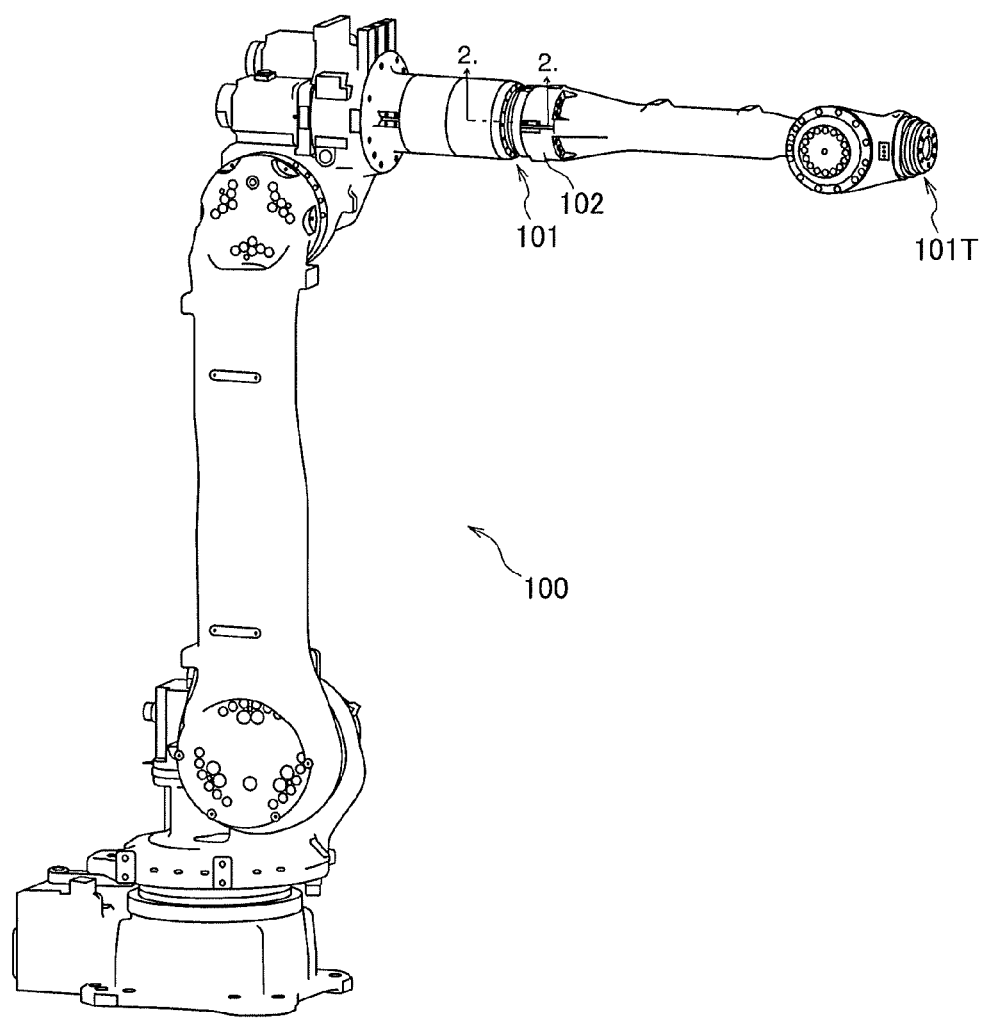
FIG. 1 illustrates an example of a robot according to an embodiment.

The embodiments will now be described with reference to the accompanying drawings, wherein like reference numerals designate corresponding or identical elements throughout the various drawings.

As illustrated in FIG. 1, a robot 100 according to this embodiment is a six-axis vertically articulated robot with direct drive joints (for example, joint 101). A robot 100 according to another possible embodiment may have any other configuration with joint(s) provided with a drive mechanism.

In this embodiment, the joint 101 of the robot 100 is provided with a drive mechanism 1. In another possible embodiment, any other joint than the joint 101 may be provided with the drive mechanism 1. In the embodiment of FIG. 1, an arm 102 is mounted on the joint 101.

Figure 2:
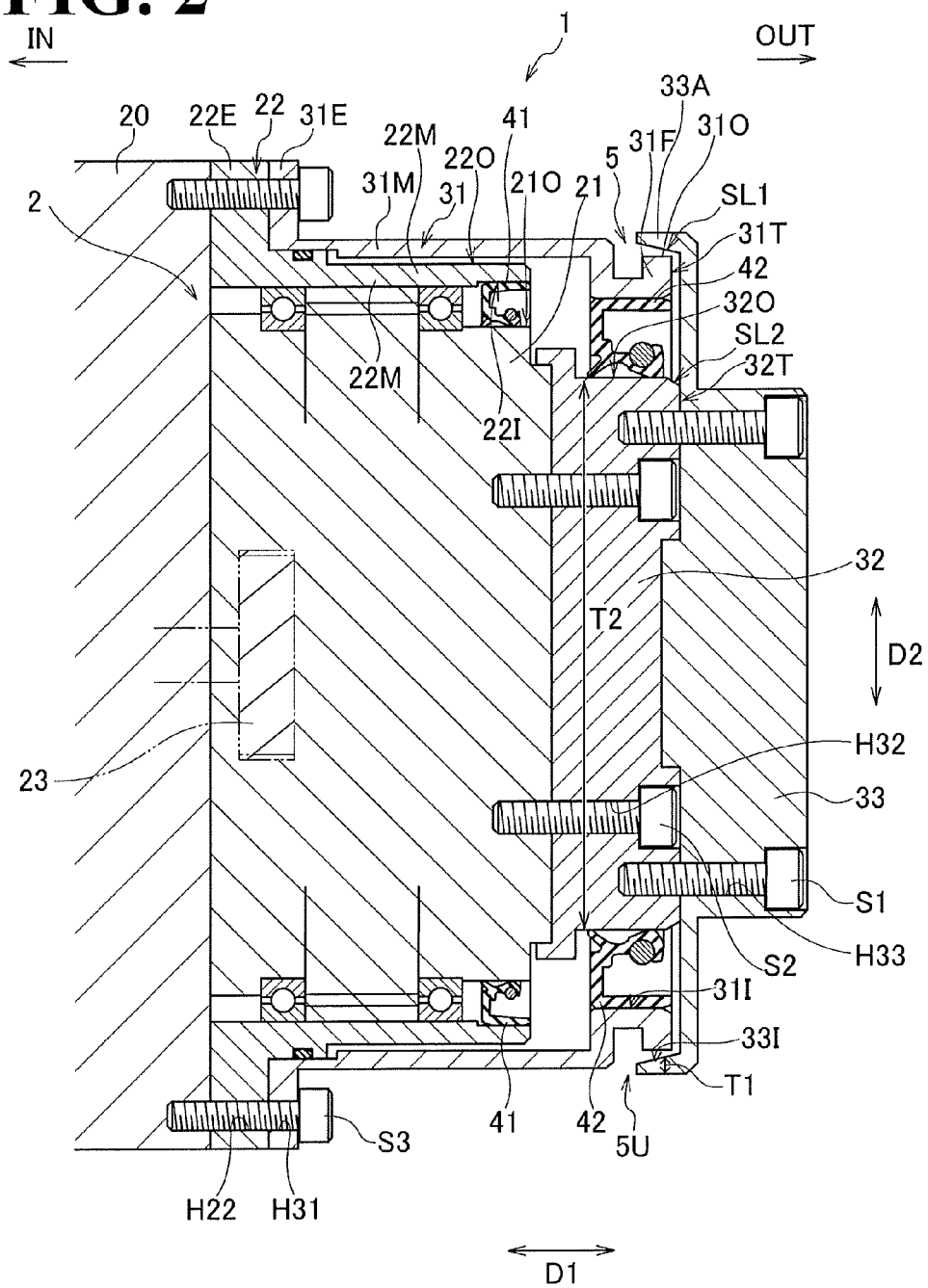
FIG. 2 is a cross-sectional view of a drive mechanism disposed in a joint of the robot illustrated in FIG. 1, illustrating an internal structure of the drive mechanism.
Figure 3:
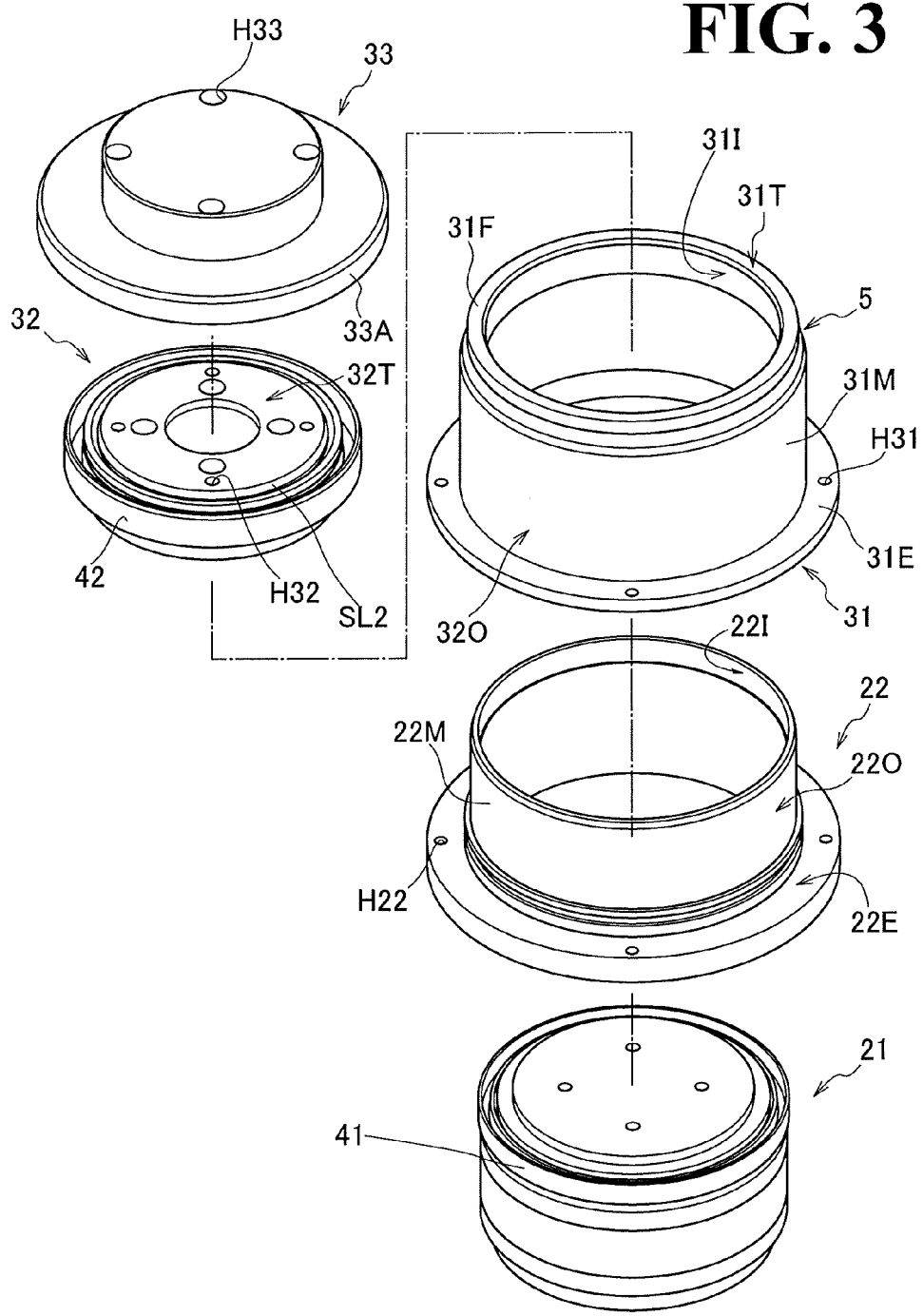
FIG. 3 illustrates exemplary components of the drive mechanism illustrated in FIG. 2.

As illustrated in FIGS. 2 and 3, the drive mechanism 1, which is disposed in the joint 101 of the robot 100, includes a reducer 2, a first cover 31, an intermediate portion 32, a second cover 33, a first seal 41, a second seal 42, and a groove 5.

As illustrated in FIG. 2, the drive mechanism 1 has an input side IN and an output side OUT. The input side IN is the side of the drive mechanism 1 to which a motor (not illustrated) is connected. The output side OUT is the side of the drive mechanism 1 from which the driving force of the motor is output (that is, the output side OUT is the side to which a hand, an arm, or a device to be driven such as a frame is connected).

The drive mechanism 1 also has a first direction D1 and a second direction D2. The first direction D1 is parallel to the rotation axis (X, described later) of the output shaft, 21, of the reducer 2. The second direction D2 is orthogonal to the first direction D1. The second direction D2 corresponds to a radial direction of a cross-section of the output shaft 21 perpendicular to the rotation axis X.

As illustrated in FIGS. 2 and 3, the reducer 2 includes the output shaft 21, a fixed portion 22, and an input shaft 23. A motor is connected to the input side IN through the input shaft 23. The reducer 2 reduces the rotational speed of the motor at the input side IN using gears and associated devices and amplifies the driving force of the motor at the output side OUT.

The input shaft 23 is connected to the motor and rotatable about the rotation axis X. Examples of the shape of the input shaft 23 include, but are not limited to, a hollow cylindrical shape and a solid cylindrical shape.

The output shaft 21 is decelerated by gears and associated devices and, with torque amplified, rotatable about the rotation axis X. Since the output shaft 21 is connected to a hand, an arm (for example, the arm 102 illustrated in FIG. 1), a frame, and/or some other device on the output side OUT, the output shaft 21 rotates together with the hand, the arm, the frame, and/or some other device. Examples of the shape of the output shaft 21 include, but are not limited to, a hollow cylindrical shape and a solid cylindrical shape (see FIG. 3).

In the embodiment of FIG. 2, the input shaft 23 and the output shaft 21 are rotatable on the same rotation axis X. In another possible embodiment, the rotation axis of the input shaft 23 may be different from the rotation axis X of the output shaft 21.

The fixed portion 22 is fixed to a member 20 (examples including, but not limited to, an arm and a frame), which is disposed on the input side IN. As illustrated in FIGS. 2 and 3, the fixed portion 22 includes a member 22M. The member 22M is disposed outside the output shaft 21 in the second direction D2 and has a hollow cylindrical shape covering at least a part of the outer surface, 21O, of the output shaft 21. Also as illustrated in FIGS. 2 and 3, the fixed portion 22 includes a member 22E at the end of the fixed portion 22 on the input side IN. The member 22E has a hollow cylindrical longer in the second direction D2 than the member 22M.

As illustrated in FIG. 2, the first seal 41 is disposed in the gap between the output shaft 21 and the fixed portion 22 to seal the gap. In this embodiment, the first seal 41 is a contact seal element (for example, oil seal) capable of implementing lip contact or another form of contact to seal the gap between the outer surface 21O of the output shaft 21 and the inner surface, 22I, of the fixed portion 22.

The first cover 31 is fixed to the fixed portion 22 and extends beyond the outer surface 22O of the fixed portion 22 toward the output side OUT to cover the outer surface 22O of the fixed portion 22. As illustrated in FIGS. 2 and 3, the first cover 31 includes a member 31M. The member 31M is disposed outside the fixed portion 22 in the second direction D2 and has a hollow cylindrical shape covering at least a part of the outer surface 22O of the fixed portion 22. As illustrated in FIGS. 2 and 3, the first cover 31 includes a member 31E at the end of the first cover 31 on the input side IN. The member 31E has a hollow cylindrical longer in the second direction D2 than the member 31M. Also as illustrated in FIGS. 2 and 3, the first cover 31 includes a member 31F at the end of the first cover 31 on the output side OUT. The member 31F has a hollow cylindrical shorter in the second direction D2 than the member 31M.

As illustrated in FIGS. 2 and 3, the first cover 31 and the fixed portion 22 are fixed to the member 20 by screws S3. Specifically, the screws S3 are inserted through a plurality of screw holes H31 of the member 31E of the first cover 31 and through a plurality of screw holes H22 of the member 22E of the fixed portion 22. In this manner, the first cover 31 and the fixed portion 22 are fixed to the member 20.

The intermediate portion 32 is fixed to an output-side portion (on the output side OUT) of the output shaft 21. As illustrated in FIGS. 2 and 3, the intermediate portion 32 is fixed to the output shaft 21 by screws S2 being inserted through screw holes H32, which penetrate through the intermediate portion 32. Examples of the shape of the intermediate portion 32 include, but are not limited to, a hollow cylindrical shape and a solid cylindrical shape (see FIG. 3).

The second cover 33 is fixed to an output-side portion (on the output side OUT) of the intermediate portion 32, and covers the outer surface 31O of the first cover 31 and the edge, 31T, of the first cover 31 on the output side OUT. The second cover 33 is fixed to the intermediate portion 32 by screws S1 being inserted through screw holes H33, which penetrate through the second cover 33.

The second seal 42 is disposed in the gap between the first cover 31 and the intermediate portion 32 to seal the gap. In this embodiment, the second seal 42 is a contact seal element (for example, oil seal) capable of implementing lip contact or another form of contact to seal the gap between the outer surface, 32O, of the intermediate portion 32 and the inner surface, 31I, of the first cover 31.

The groove 5 extends approximately over the circumference of the outer surface 31O of the first cover 31. Specifically, in the embodiment of FIGS. 2 and 3, the groove 5 extends approximately over the circumference of the outer surface 31O of the member 31F. In another possible embodiment, the groove 5 may extend approximately over the circumference of the outer surface 31O of the member 31M. The depth of the groove 5 in the second direction D2 may be uniform over the circumference or may vary along the circumference.

With the configuration described above, the first seal 41 and the second seal 42 minimize the possibility of foreign matter entering the reducer 2 while the first cover 31 and the second cover 33 preventing direct collision of foreign matter with the first seal 41 and the second seal 42. At the same time, the groove 5 on the first cover 31 accepts foreign matter, guides the foreign matter through the groove 5 in a direction of action of gravity, and discharges the foreign matter at the lowermost portion of the groove 5 (portion 5U illustrated in FIG. 2).

The second cover 33 includes a first portion 33A. The first portion 33A covers the outer surface 31O of the first cover 31. Specifically, the first portion 33A covers the outer surface 31O of the member 31F. In the embodiment of FIG. 2, the first portion 33A covers at least a part of the groove 5. In another possible embodiment, the groove 5 is not covered by the first portion 33A.

On the inner surface, 33I, of the first portion 33A, a first slope SL1 is formed. The first slope SL1 has a thickness T1 in the second direction D2. The thickness T1 becomes greater toward the output side OUT.

With this configuration, if foreign matter should enter the gaps between the first cover 31, the second cover 33, and the intermediate portion 32, the centrifugal force of rotation of the output shaft 21 forces the foreign matter onto the first slope SL1, and the centrifugal force further forces the foreign matter out of the drive mechanism 1 through the first slope SL1.

On the outer surface 32O of the intermediate portion 32, a second slope SL2 is formed. The second slope SL2 has a thickness T2 in the second direction D2. The thickness T2 becomes smaller toward the output side OUT. In the embodiment of FIG. 2, the second slope SL2 extends to reach the edge, 32T, of the intermediate portion 32 on the output side OUT.

The second slope SL2 contacts the second cover 33, which is further on the output side OUT than the second seal 42, and thus defines a groove that helps discharge foreign matter (for example, water) along the second cover 33.

In this embodiment, the second cover 33 is the arm 12 (see FIG. 1), which is connected to the joint 101. In another possible embodiment where the drive mechanism 1 is disposed in a joint 101T at the leading end of the robot 100, the second cover 33 may be a hand (specifically, a flange for the hand). In still another possible embodiment, the second cover 33 may be a device to be driven such as a frame connected to the joint 101.

By implementing the second cover 33 by the arm 102 of the robot 100, a hand, or a device to be driven such as a frame, the number and kinds of materials to be used are reduced.

The robot 100 and the drive mechanism 1 according to this embodiment prevent foreign matter from entering the joint 101 even in environments where contamination by foreign matter is highly possible.

Obviously, numerous modifications and error of the present disclosure are possible in light of the above teachings. It is therefore to be understood that within the scope of the appended claims, the present disclosure may be practiced otherwise than as specifically described herein.

What is claimed as new and desired to be secured by Letters Patent of the United States is:

1. A robot, comprising:
   a joint; and
   a drive mechanism disposed in the joint and comprising a reducer, a first cover covering an outer surface of the reducer, an intermediate portion connected to the reducer, and a second cover covering an output-side edge of the intermediate portion,
   wherein the reducer comprises an output shaft and a fixed portion on an outer surface of the output shaft such that the output shaft and the fixed portion form a first gap, the first cover is fixed to the fixed portion and extending beyond an outer surface of the fixed portion toward an output side of the drive mechanism such that the first cover is covering the outer surface of the fixed portion and has a groove extending over a circumference of the outer surface of the first cover, the intermediate portion is fixed to an output-side portion of the output shaft and forming a second gap with the first cover at the groove of the first cover, the second cover is fixed to an output-side portion of the intermediate portion and covering an outer surface of the first cover and an output-side edge of the first cover, and the drive mechanism further comprises a first seal positioned in and sealing the first gap between the output shaft and the fixed portion, and a second seal positioned in and sealing the second gap between the first cover and the intermediate portion.

2. The robot according to claim 1, wherein the drive mechanism has a first direction parallel to a rotation axis of the output shaft, and a second direction orthogonal to the first direction, the second cover has a first portion covering the outer surface of the first cover, and the first portion of the second cover has a first slope formed on an inner surface of the first portion such that the first slope has a first thickness in the second direction of the drive mechanism that becomes greater toward the output side.

3. The robot according to claim 2, wherein the intermediate portion has a second thickness in the second direction of the drive mechanism and a second slope formed on an outer surface of the intermediate portion such that the second slope has the second thickness that becomes smaller toward the output side.

4. The robot according to claim 1, wherein the second cover comprises an arm connected to the joint.

5. The robot according to claim 2, wherein the second cover comprises an arm connected to the joint.

6. The robot according to claim 3, wherein the second cover comprises an arm connected to the joint.

7. The robot according to claim 1, wherein at least one of the first seal and the second seal comprises a contact seal element.

8. The robot according to claim 2, wherein at least one of the first seal and the second seal comprises a contact seal element.

9. The robot according to claim 3, wherein at least one of the first seal and the second seal comprises a contact seal element.

10. The robot according to claim 4, wherein at least one of the first seal and the second seal comprises a contact seal element.

11. The robot according to claim 5, wherein at least one of the first seal and the second seal comprises a contact seal element.

12. The robot according to claim 6, wherein at least one of the first seal and the second seal comprises a contact seal element.

13. The robot according to claim 1, wherein the reducer further comprises an input shaft configured to be connected to a motor on an input side of the drive mechanism.

14. The robot according to claim 2, wherein the reducer further comprises an input shaft configured to be connected to a motor on an input side of the drive mechanism.

15. The robot according to claim 3, wherein the reducer further comprises an input shaft configured to be connected to a motor on an input side of the drive mechanism.

16. The robot according to claim 4, wherein the reducer further comprises an input shaft configured to be connected to a motor on an input side of the drive mechanism.

17. The robot according to claim 1, wherein the fixed portion of the reducer has a hollow cylindrical shape such that the fixed portion is fitted to the output shaft of the reducer with the first gap.

18. The robot according to claim 2, wherein the fixed portion of the reducer has a hollow cylindrical shape such that the fixed portion is fitted to the output shaft of the reducer with the first gap.

19. The robot according to claim 1, wherein the first cover has a hollow cylindrical shape such that the first cover is fitted to cover the reducer and the intermediate portion with the second gap.

20. The robot according to claim 2, wherein the first cover has a hollow cylindrical shape such that the first cover is fitted to cover the reducer and the intermediate portion with the second gap.

* * * * *